United States Patent
Schütz

(10) Patent No.: US 6,376,038 B1
(45) Date of Patent: Apr. 23, 2002

(54) ADHESIVE TAPE PACK FOR FURTHER PROCESSING, FOR EXAMPLE IN BOOK-OR BINDING TECHNOLOGY

(75) Inventor: Ernst Schütz, Rimsting am Chiemsee (DE)

(73) Assignee: Planatol Klebetechnik GmbH (DE)

( * ) Notice: Subject to any disclaimer, the term of this patent is extended or adjusted under 35 U.S.C. 154(b) by 0 days.

(21) Appl. No.: 09/529,141

(22) PCT Filed: Oct. 9, 1998

(86) PCT No.: PCT/EP98/06416

§ 371 Date: Apr. 5, 2000

§ 102(e) Date: Apr. 5, 2000

(87) PCT Pub. No.: WO99/19413

PCT Pub. Date: Apr. 22, 1999

(30) Foreign Application Priority Data

Oct. 14, 1997 (DE) ..................................... 297 18 169 U

(51) Int. Cl.$^7$ ................................................. B32B 7/06
(52) U.S. Cl. ....................... 428/40.1; 428/42.2; 428/48; 428/77; 428/347; 428/906; 156/268
(58) Field of Search ........................... 428/48, 40.1, 77, 428/169, 167, 347, 42.2, 348, 349, 906; 156/268, 271

(56) References Cited

U.S. PATENT DOCUMENTS

| | | |
|---|---|---|
| 1,967,444 A | 7/1934 | Lowe |
| 3,267,623 A | 8/1966 | Block |
| 4,372,472 A | 2/1983 | Herrmann |

FOREIGN PATENT DOCUMENTS

| | | |
|---|---|---|
| DE | 1 948 322 | 7/1966 |
| DE | 1 984 979 | 11/1967 |
| DE | 83 22 398.3 | 11/1983 |
| DE | 40 33 834 A1 | 5/1991 |
| DE | 41 25 932 A1 | 2/1993 |
| DE | 195 29 177 A1 | 2/1997 |
| DE | 297 01 215 U | 6/1997 |
| EP | 0 312 349 | 10/1989 |
| EP | 0 729 850 A1 | 9/1996 |
| FR | 1 268 972 A | 12/1961 |
| WO | WO 89 09129 | 10/1989 |

*Primary Examiner*—Alexander S. Thomas
(74) *Attorney, Agent, or Firm*—McGlew and Tuttle, P.C.

(57) ABSTRACT

An adhesive tape pack, in which an adhesive layer (3), preferably a hot-melt adhesive layer, is arranged on at least one carrier element (2). In order to provide adhesive tape packs of this type with tape sections (5), which can be easily separated from one another, the present invention provides for providing the carrier element (2) with notches (4) transversely to the longitudinal direction of the tape, which cut through the carrier element (2), but not the adhesive layer (3). In this way, the tape sections (5) are held together by means of the adhesive layer (3) and can be separated by lightly cutting through the adhesive layer (3) along the notches (4).

19 Claims, 3 Drawing Sheets

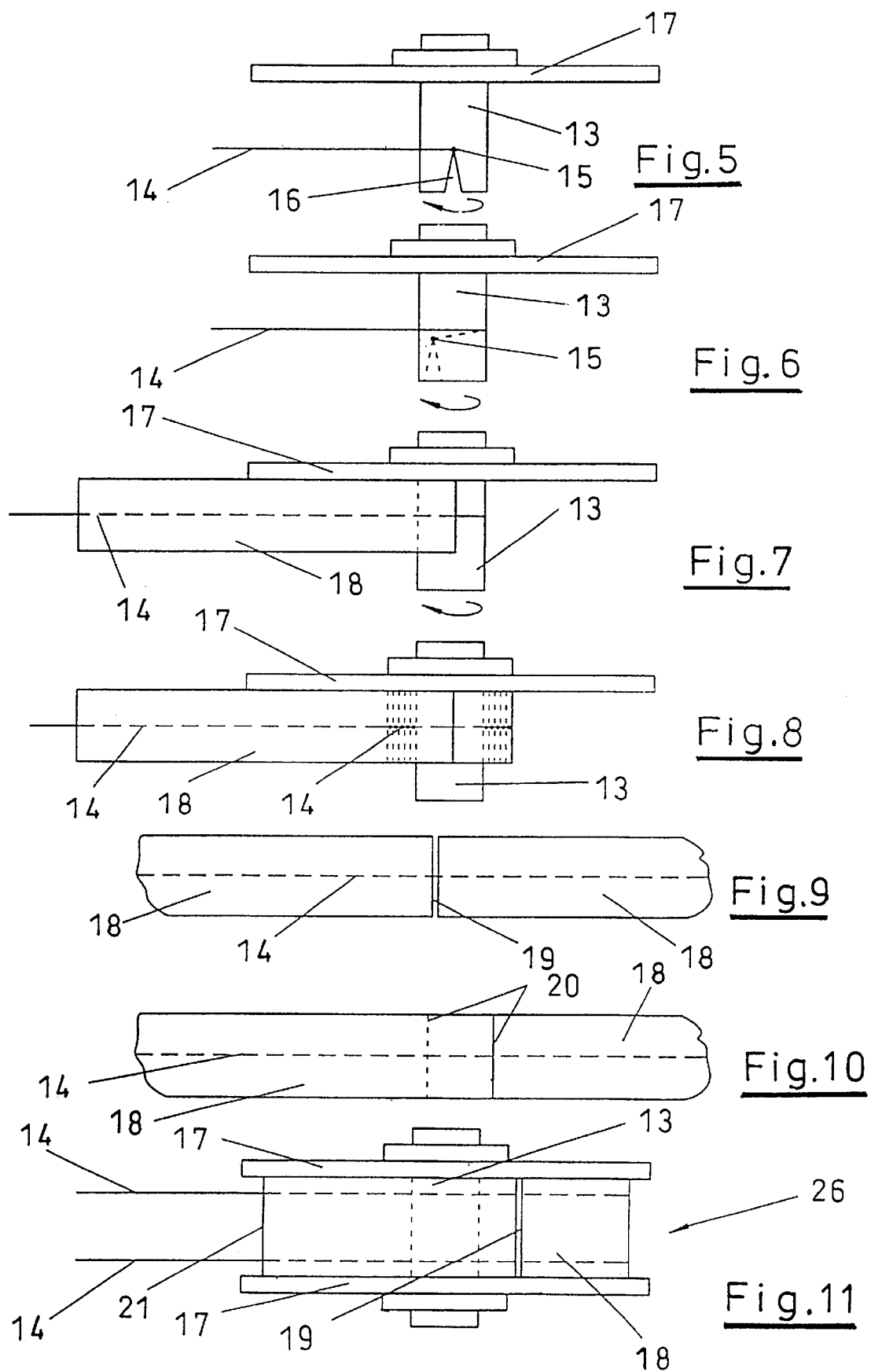

ADHESIVE TAPE PACK FOR FURTHER PROCESSING, FOR EXAMPLE IN BOOK-OR BINDING TECHNOLOGY

FIELD OF THE INVENTION

The present invention pertains to an adhesive tape pack, e.g., for further processing in book-binding or pad/block-binding technology in which a carrier element in the sheet or tape form primarily has a hot-melt adhesive layer.

BACKGROUND OF THE INVENTION

The present invention pertains to an adhesive tape pack, e.g., for further processing in book-binding or block-binding technology in which a carrier element in the sheet or tape form primarily has a hot-melt adhesive layer.

SUMMARY AND OBJECTS OF THE INVENTION

Therefore, the primary object of the present invention is to present and to mount coated adhesive tapes, so that they can be removed for the individual work process in a problem-free manner and without trouble.

The object set is accomplished according to the present invention in that the adhesive tape pack has tape sections that are separated from one another, whose edges adjoining one another are formed by notches, which cut through at least the carrier element, but not the adhesive layer.

The result of this measure is that the tape sections are held next to one another by the adhesive layer which is not or not completely cut through, and they may be easily detached from one another. The cohesion of the adhesive layer should be so great that it easily guarantees the cohesion of the tape sections in the adhesive tape pack, but easily permits the detachment of the individual tape section by means of tearing off or shearing off.

According to the present invention, hot-melt adhesive strips, the hot-melt adhesive layer of which can be easily notched, are especially suitable for this purpose. However, the present invention is not limited to the use of hot-melt adhesives.

In terms of the present invention, the notch may also penetrate more or less deeply into the hot-melt adhesive layer. It is essential for the remaining area of the hot-melt adhesive layer to guarantee the cohesion of the adhesive tape pack.

Adhesive tapes with desired tear points are known per se. In WO 89/09129 and U.S. Pat. No. 1,967,444, the tape-like carrier elements are coated with a pressure-sensitive adhesive, which must be covered with a protective film in order to achieve no adverse adhesion. The desired tear lines penetrate only partly into the carrier element, which cutting through same, as is stipulated by the present invention. In the present invention the hot-melt adhesive layer assumes the carrying function, which especially results in that a new and different process for the production of adhesive tapes is used in the present invention, as the hot-melt adhesive must be applied to the carrier element and must be cured before the carrier element is cut through in places. In the state of the art, on the other hand, the desired tear lines are cut into the carrier element before the adhesive is applied to the carrier element.

In a preferred exemplary embodiment, the tape sections are wound up end to end as a roll, whereby the notches run transversely to the longitudinal extension of the tape sections. Such a roll may be mounted in a tape holder provided with a dispensing slot, as a result of which the packaging and presenting for the purpose of processing the tape sections are given by one and the same subject. Such tape holders are known in themselves, e.g., through U.S. Pat. No. 4,372,472.

In the stack, it is possible for the blanks to be put together in the form of individual sheets or as an adhesively bound block. The formation of stacks with a zigzag fold of the blanks connected to one another is also provided, e.g., within the framework of the present invention.

Finally, the adhesive tape pack may have more than two layers, in which case the adhesive layer is located between every two carrier elements, which are cut through up to the adhesive layer.

The subject of the present invention also includes a device for the production of adhesive tape packs of the type according to the present invention. Accordingly, the cutting depth of the blade is set in a longitudinal and/or cross cutter for carrier elements coated on one side with hot-melt adhesive, such that the blade cuts through the carrier element, but not the hot-melt adhesive layer. In this case, it proves to be advantageous if the cutter has an adhesive tape unwinding roll in front of the blade and a winding-up roll behind the blade for the adhesive tape provided with transverse notches.

As already mentioned in the introduction, the cutting depth of the blade may also be adjusted, such that the notch also still protrudes somewhat into the hot-melt adhesive layer. However, the leftover remaining thickness of the hot-melt adhesive should still be so stable that it guarantees the cohesion of the adhesive tape pack.

Another, and in itself independent, inventive solution to the object set lies in that the end of at least one thread- or tape-like guide web is fixed to a tape reel, and the reservoir is formed by winding up this guide web together with a large number of successive blanks of the coated tapes, in such a way that the thread- or tape-like guide web comes to lie between each tape layer of the tape roll formed in this manner.

This guide web according to the present invention reliably separates the individual layers in the tape roll from one another if the coated tape blanks are removed by unwinding the reservoir. Even if the adhesive layer of the individual blanks displays adhesive action, this adhesive layer does not in any way interfere with the removal of the blanks, because the guide web located between the individual tape layers reliably makes possible the separation of the individual tape layer from the next one.

At the same time the guide web according to the present invention makes it possible to make pulling off the individual tape blanks from the tape roll easier.

The guide web according to the present invention can be a thread that comes to lie approximately in the middle of the wound-up tape. It is likewise possible to fix two or more threads, separated from one another, with their ends to a tape reel and to wind these up separately from one another together with the tape blanks. Finally, a guide web should be used that has a considerably greater width, i.e., compared with a thread. It is crucial for the guide web to consist of a material that can be detached easily from an adhesive layer.

However, it is also conceivable to join the blanks together by means of said adhesive elements, e.g., tapes, which partially cover their edges which adjoin one another.

Some other embodiment variants of the present invention are shown. Thus, e.g., the blanks may be wound up end to end on the tape reel or the tape roll, which, however, does not rule out that the blanks may also be wound up overlapping one another. The present invention does not even rule out a winding up of the blanks with gaps located between them.

It has been proven in practice that the adhesive layer of the wound-up blanks should be located on the side thereof directed outwards in the wound-up state. This measure makes it easier to introduce the pulled-off blank from the bottom against the back of a stack of sheets in order to bring about the planned adhesive binding there.

The reservoir according to the present invention generally consists of the mentioned tape reel which is first of all provided on one side with a disk in order to bring about a limitation of the tape roll that is being wound up. So that the end of the guide web may be easily connected to the tape reel, it is recommended to place a second disk on the tape reel only if the end of the guide web is fixed.

A reservoir formed under the terms of the present invention may according to the present invention be rotatably mounted in a housing that has a wall opening for the guiding through of the tapes and the guide web. Of course, this measure includes the fact that reservoirs of this type must be able to be easily replaced with one another in order to make possible an adhesive binding technique for higher numbers of pieces.

For the same reason, it is recommended to mount a drivable axle especially in counterrotation to the direction of tape removal in or next to the housing for winding up the pulled-off guide web. Due to the motor drive of this axle it is possible to pull off the needed blank from the reservoir in each case.

The present invention is further characterized by the incorporation of the reservoir into an adhesive binding device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a schematic top view of a tape reel for winding up a guide web and a tape blank in a position;

FIG. 6 is a schematic top view of a tape reel for winding up a guide web and a tape blank in another position;

FIG. 7 is a schematic top view of a tape reel for winding up a guide web and a tape blank in another position;

FIG. 8 is a schematic top view of a tape reel for winding up a guide web and a tape blank in another position;

FIG. 9 is a top view of two tape blanks with an end-to-end arrangement;

FIG. 10 is a top view of two tape blanks with an overlapping arrangement of the ends;

FIG. 11 is a top view of a reservoir with a ready-to-use tape roll; and

DESCRIPTION OF THE PREFERRED EMBODIMENT

Figure 1:
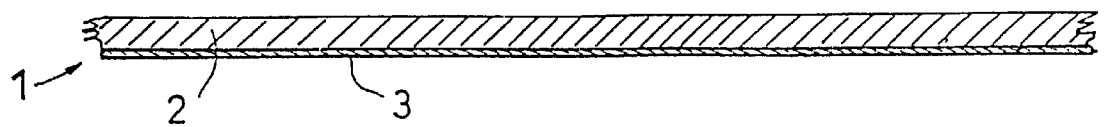
FIG. 1 is a longitudinal sectional view through an adhesive tape with a hot-melt adhesive layer.

Referring to the drawings in particular, the cross section of FIG. 1 shows a highly enlarged view of a partial longitudinal section of an adhesive tape. The adhesive tape 1 has a carrier element 2 made of paper, linen, or the like, and is preferably provided on one side with a hot-melt adhesive layer 3. In the cold state, the hot-melt adhesive layer 3 has no adhesive action. The adhesiveness only forms by heating up the hot-melt adhesive layer 3. Naturally, the thickness of the carrier element 2 is approximately $300\mu$, whereas the adhesive layer has a thickness of approximately 185 to $195\mu$.

Figure 2:
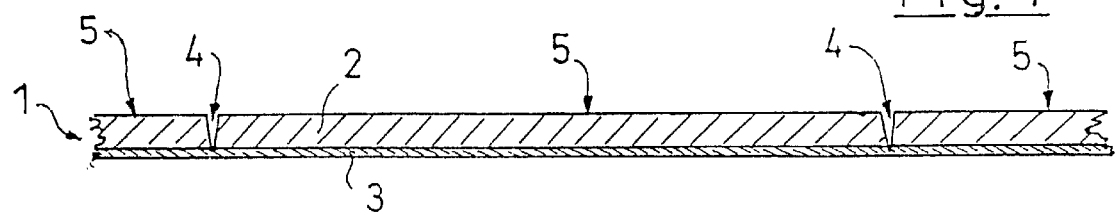
FIG. 2 is a longitudinal sectional view through the adhesive tape according to FIG. 1 with notches running transversely to the direction of the tape.

If the adhesive tape 1 is now provided with notches 4 in terms of the view according to FIG. 2, which cut through the carrier element 2, but not the hot-melt adhesive layer 3, then a sequence of tape sections 5 forms, which adjoin one another and which can be easily separated from each other by tearing off or by pulling off along a line congruent to the notch 4. The cohesion of the hot-melt adhesive layer 3 is so great that it guarantees a firm cohesion of the tape sections 5 in spite of the notches 4. However, the hot-melt adhesive layer 3 does not resist the tearing off or pulling off of the individual tape 5 to any greater degree. If the properties of the hot-melt adhesive layer 3 permit this, the notch 4 may also penetrate into the hot-melt adhesive layer 3, without, however, penetrating through it. It is essential that the remainder of the hot-melt adhesive layer 3 be stable enough to hold the adhesive tape pack 1 together.

The carrier element 2 may be arranged on both sides of the hot-melt adhesive layer 3 as well. A number of layers of carrier elements 2 and hot-melt adhesive layers 3 may likewise be formed.

Figure 3:
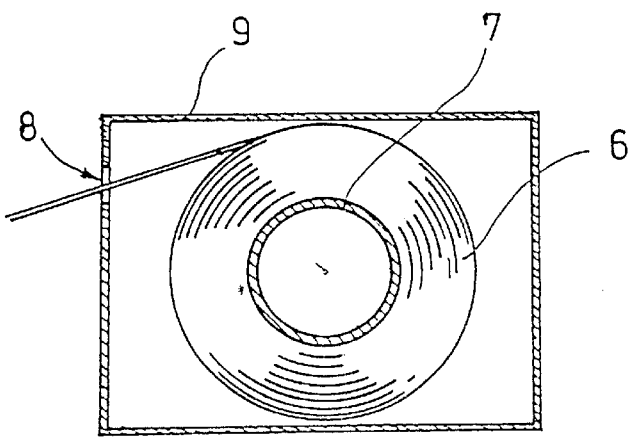
FIG. 3 is a cross sectional view through a tape holder which has an adhesive tape roll mounted therein.

FIG. 3 shows a presentation of the adhesive tape 1 in the form of a roll 6 which is wound up on a core 7 and is mounted in a tape holder 9. The tape holder 9 has a dispensing slot 8, through which the adhesive tape 1, 5 can be pulled off This tape holder 9 may be a packing element and a presentation element on the adhesive binding device at the same time.

The preparation of such an arrangement is relatively simple. We start with an adhesive tape roll 1 or several adhesive tape rolls 1 arranged next to one another, from which the adhesive tape 1 is guided into a cross cutter, which makes cross cuts by means of a height-adjustable blade against a countercylinder or an underlying strip, e.g., a silicone strip. The blade is adjusted such that it cuts completely through the carrier element 2, but not through the hot-melt adhesive layer 3. Such an adhesive tape 1 provided with notches 4 extending crosswise is then rolled up again and is, e.g., shipped in the form of the presentation according to FIG. 3.

However, the ready-to-use adhesive tape 1 may be folded in the form of a fanfold stack as well, in which case the area of the hot-melt adhesive layer not covered by the notch 4 forms the respective fold.

Figure 4:
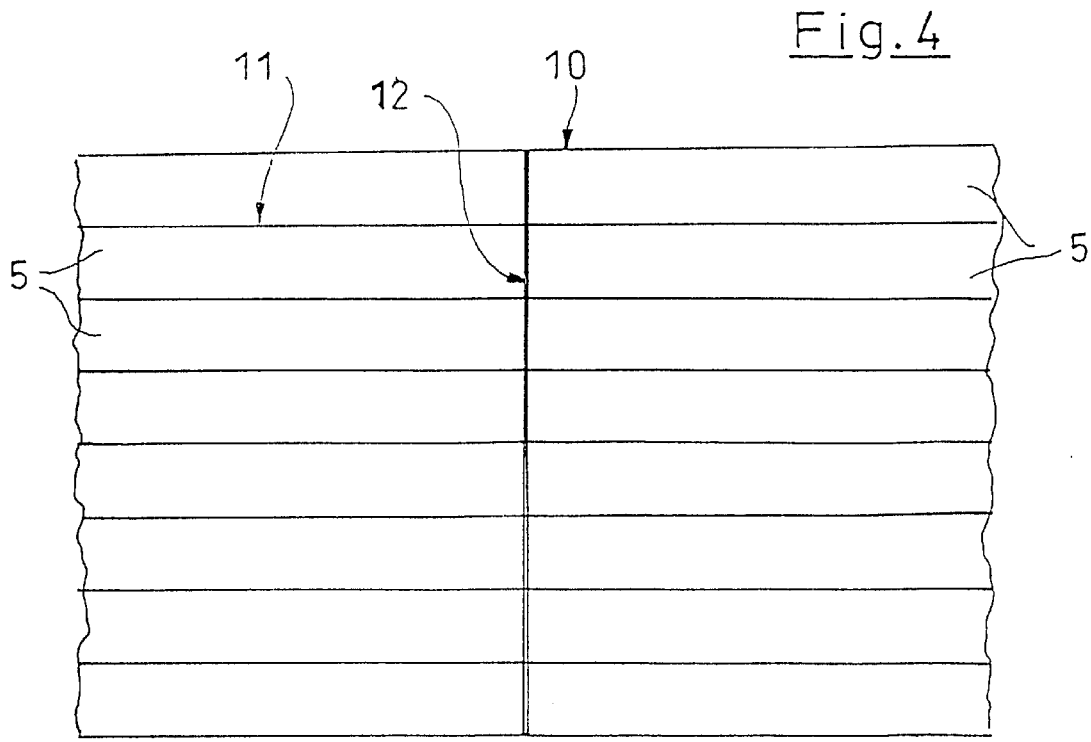
FIG. 4 is a top view of a blank as an adhesive tape pack for a number of tape sections.

FIG. 4 shows an embodiment variant, according to which the tape sections 5 are put together in a blank 10 and separated from one another by means of longitudinal notches 11 and transverse notches 12. Also, these notches 11, 12 are only so deep that they cut through at least the carrier element material 2, but not the hot-melt adhesive layer 3. A plurality of such blanks 10 can be packed and shipped in the form of a stack. It is up to the person skilled in the art whether the blank 10 contains only longitudinal notches 11 or transverse notches 12 or both.

On the subject of FIGS. 2 and 3, the present invention also includes a process and a device for the production of adhesive tapes with transverse notches in the form of rolls. The process consists of making transverse notches in the carrier element of the adhesive tape, which cut through the carrier element 2, but not through the hot-melt adhesive layer. After the notches are made, the adhesive tape is wound up again and optionally presented in a tape holder.

A device that is suitable for carrying out this process consists of a cutter, the cutting blade of which is height-adjustable and is adjusted such that it only cuts through the carrier element 2, but not the hot-melt adhesive layer 3. Tape reels are advantageously provided in front of and behind the cutting blade, from which the adhesive tape is pulled off according to a design according to FIG. 1 and is wound up again after the notches are made.

However, the integration of the cutter in a coating system before the winding-up process of the roll or rolls is also conceivable. It is likewise possible to integrate the cross cutter into a roll cutter for longitudinal cuts so as to cut individual rolls of a wider web and to provide them with cross cuts at the same time.

FIGS. 5 to 12 show another possibility for accomplishing the object set, which is of independent inventive significance.

First, it is shown in FIG. 5 that the end 15 of a thread-like guide web 14 is fixed to a tape reel 13 at 16. The tape reel 13 is limited on one side by a disk 17. To fix the end of the web 15, e.g., a slot in the tape reel 13 may be used. In any case, this measure should make it possible to wind up the guide web 14 about its axle by rotating the tape reel 13, as this is shown in FIG. 6.

According to FIGS. 7 and 8 blanks 18 of coated tapes are henceforth wound up together with the guide web 14 on the tape reel 13. With progressive winding up, an image according to FIG. 8 forms, according to which the guide web 14 is located between each layer of the wound-up tape blanks 18.

The coated tape blanks 8 may be wound up according to the example of FIG. 9 by means of an end-to-end arrangement 19 or according to FIG. 10 by means of overlapping 20 the tape ends. It is also not harmful if a gap is located between the tape ends.

However, it is also possible to join adjoining tape blanks 18 to one another by means of adhesive elements, e.g., tapes, which partially cover their adjoining edges.

So that the tape blanks 18 have an orderly lateral guidance during the winding up on the tape reel 13, it is recommended to place a second disk 17 onto the tape reel 13 according to the example of FIG. 11. This FIG. 11 shows a ready-to-use reservoir 26, in which a plurality of coated tape blanks 18 are wound up onto a tape reel 13. As an alternative to FIG. 5, it is further shown in FIG. 11 that two guide webs 14 separated from one another may be wound up as well. Instead of these guide webs 14 in the thread form, a tape-like guide web may also be wound up. At the end of the winding process, the guide web 14 projects outwards to provide a handle for the unwinding of the tape roll 21.

Figure 12:
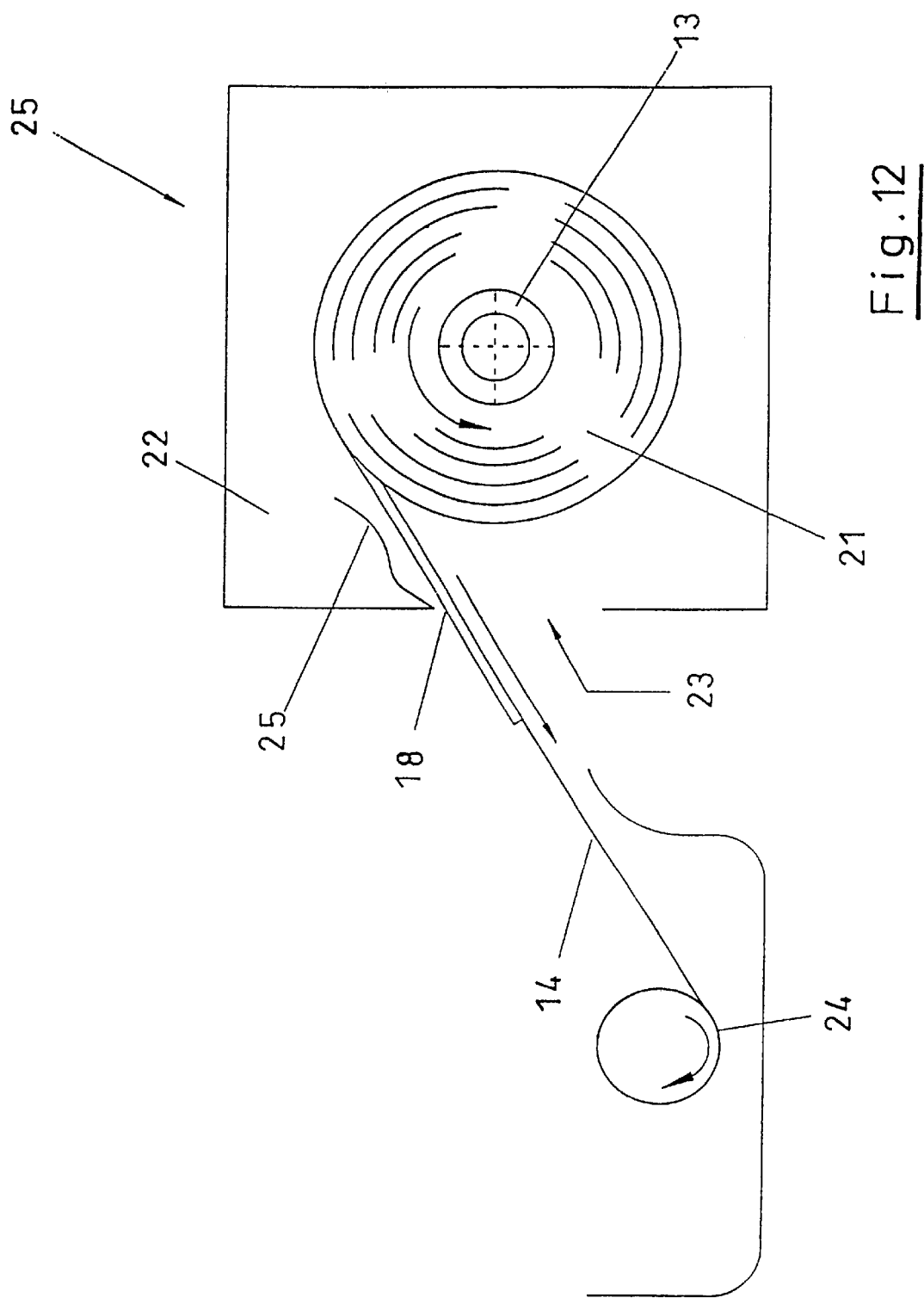
FIG. 12 is a schematic lateral view of a housing for accommodating a reservoir according to the present invention.

A reservoir 26 according to FIG. 11 can, in terms of the exemplary embodiment of FIG. 12, be mounted in a housing 22 which has a wall opening 23, through which the composite of the guide web 14 and the tape blank 18 can be pulled off. In this case, it is recommended that the adhesive layer of the tape blank in the tape roll 21 come to lie outwards. The guide web 14, which covers the layer of tape blanks lying under it from the outside, is located under it tape roll 21. Thus, an unwinding of the tape blanks 18 from the tape roll 21 can easily be brought about by pulling on the guide web 14.

In the housing 22 is located a deflector 25, which prevents the individual layers of the tape roll from being able to extend because of their own tension.

In the area of the housing 22 or in an adjoining housing is located an axle 24, which is intended for winding up the guide web 14, while the coated tape blanks 18 are pulled off. It has proven to be practical to fix the direction of rotation of the axle 24 inversely to the pulling-off direction of rotation of the tape roll 21.

It is evident that the reservoirs 26 that are mounted in the housing 22 must be replaceable so as to achieve a rapid removal of the wound-up tape blanks.

While specific embodiments of the invention have been shown and described in detail to illustrate the application of the principles of the invention, it will be understood that the invention may be embodied otherwise without departing from such principles.

What is claimed is:

1. An adhesive tape pack, comprising:
    a carrier element in the sheet or tape form;
    a hot-melt adhesive layer on said carrier, the adhesive tape pack having tape sections separated from one another, said tape sections having adjoining edges formed by notches, said notches extending through at least said carrier element but not extending through said adhesive layer.

2. An adhesive tape pack in accordance with claim 1, wherein said tape sections are wound up end to end as a roll and said notches run transversely to a longitudinal extension of said tape sections.

3. An adhesive tape pack in accordance with claim 2, wherein said roll is mounted in a tape holder which is provided with a dispensing slot.

4. An adhesive tape pack in accordance with claim 1, wherein a number of said tape sections are put together next to one another and also behind one another as a blank and are separated from one another by longitudinally running and transversely running notches.

5. An adhesive tape pack in accordance with claim 1, wherein said tape sections are together in a fanfold stack form.

6. An adhesive tape pack in accordance with claim 1, wherein the adhesive tape pack has more than two layers, of which adhesive layers are located on both sides of a respective carrier element and said carrier element has said notches.

7. An adhesive tape pack according to claim 1, further comprising:
    a reel said, wherein said tape sections are wound up end to end as a roll on said reel with an end with a tape-like guide web fixed to said reel, and a reservoir formed by winding up said guide web together with a plurality of successive blanks of coated tapes, in such a way that tape-like guide web comes to lie between each tape layer of the tape roll thus formed.

8. An adhesive tape pack according to claim 7, wherein said blanks are wound up end to end.

9. An adhesive tape pack according to claim 7, wherein said blanks are wound up overlapping one another.

10. An adhesive tape pack according to claim 7, wherein said adhesive layer of said blanks is located on a side directed outwards in the wound-up state.

11. An adhesive tape pack according to claim 7, wherein said blanks are joined together by means of adhesive elements partially covering their adjoining edges.

12. An adhesive tape pack according to claim 7, wherein said disks are guided on said reel for the bilateral limitation of said roll.

13. An adhesive tape pack according to claim 7, where said reservoir is rotatably mounted in a housing which has a wall opening for guiding through the tapes and the guide web.

14. An adhesive tape pack according to claim 13, further comprising an axle that can be driven in opposition to a direction of tape removal is mounted in or next to said housing for winding up the web.

15. An adhesive tape pack according to claim 14, formed as part of an adhesive binding device.

16. A process for producing an adhesive tape pack comprising a carrier element in the sheet or tape form a hot-melt adhesive layer on said carrier, the adhesive tape pack having tape sections separated from one another, said tape sections having adjoining edges formed by notches, said notches extending through at least said carrier element but not extending through said adhesive layer, the process comprising:

coating a carrier element with said hot-melt adhesive;

curing the hot-melt adhesive layer;

subsequent to said step of curing the hot-melt adhesive layer cutting said carrier element through up to said hot-melt adhesive layer to form said notches.

17. A process for producing an adhesive tape pack comprising a carrier element in the sheet or tape form a hot-melt adhesive layer on said carrier, the adhesive tape pack having tape sections separated from one another, said tape sections having adjoining edges formed by notches, said notches extending through at least said carrier element but not extending through said adhesive layer, the process comprising:

employing a longitudinal and/or cross cutter for cutting said carrier elements coated on one side with said hot-melt adhesive; and adjusting the cutting depth of a blade such that it cuts through at least said carrier element, but not through said hot-melt adhesive layer.

18. A process in accordance with claim 17, wherein said cutter has an adhesive tape unwinding roll in front of the said blade and a said winding-up roll behind the blade for the said adhesive tape provided with said transverse notches.

19. A process in accordance with claim 18, wherein said cutter is integrated into a coating system or into a roll cutter for longitudinal cutting in front of the winding-up roll.

\* \* \* \* \*